(12) United States Patent
Cheng

(10) Patent No.: US 11,698,221 B2
(45) Date of Patent: Jul. 11, 2023

(54) FOLDING COOLING RACK

(71) Applicant: Gaomei Cheng, Guangdong (CN)

(72) Inventor: Gaomei Cheng, Guangdong (CN)

( * ) Notice: Subject to any disclaimer, the term of this patent is extended or adjusted under 35 U.S.C. 154(b) by 119 days.

(21) Appl. No.: 17/513,283

(22) Filed: Oct. 28, 2021

(65) Prior Publication Data
US 2022/0299258 A1 Sep. 22, 2022

(30) Foreign Application Priority Data

Mar. 19, 2021 (CN) .......................... 202120566575.5

(51) Int. Cl.
*F25D 25/02* (2006.01)
*A23L 3/36* (2006.01)
*F25D 1/00* (2006.01)
*A47F 5/10* (2006.01)

(52) U.S. Cl.
CPC ............... *F25D 25/02* (2013.01); *A23L 3/36* (2013.01); *F25D 1/00* (2013.01); *A47F 5/10* (2013.01)

(58) Field of Classification Search
CPC ... F25D 25/02; F25D 1/00; A43L 3/36; A47F 5/10; A47F 7/0071; D06F 57/10; A47B 43/00; A47G 2400/06
See application file for complete search history.

(56) References Cited

U.S. PATENT DOCUMENTS

| | | | | |
|---|---|---|---|---|
| 612,479 A | * | 10/1898 | Casey | A47G 25/746 135/145 |
| 872,235 A | * | 11/1907 | Himmell | D06F 57/10 211/202 |
| 922,566 A | * | 5/1909 | Corbin | A47G 25/746 211/105 |
| 1,109,038 A | * | 9/1914 | Burns | F16M 11/04 211/105 |
| 1,533,470 A | * | 4/1925 | Schmitt | D06F 57/10 211/202 |

(Continued)

*Primary Examiner* — Devin K Barnett
(74) *Attorney, Agent, or Firm* — Sandy Lipkin

(57) ABSTRACT

The invention relates to a folding cooling rack for baking food, including the main frame and the cooling rack, the main frame as mentioned is equipped with legs and connecting rod component on its left and right ends, the legs as mentioned are equipped with first fixing rail at its front and back ends, the first fixing rail as described is connected respectively at both of its ends to the legs as mentioned by the first nut device, the legs as mentioned are also equipped with a chute. The connecting rod component is composed of two connecting rod, the two connecting rod component as described are flexibly connected at the center by rivet connection device, the connecting rod components as described are connected to pulley connecting rod below their front end, the pulley connecting rod as mentioned is equipped with plastic pulley at each end, the plastic pulley as mentioned is flexibly connected to the chute, using multiple connecting rod component and cooling rack, the efficiency of the use of cooling rack is greatly improved, while manpower, material and time are saved; by using height control groove and pulley connecting rod, the height can be flexibly adjusted according to the use of the rack, and the operation is simple, it can easily be operated and used by one person.

5 Claims, 2 Drawing Sheets

(56) References Cited

U.S. PATENT DOCUMENTS

| | | | | |
|---|---|---|---|---|
| 1,616,870 | A | * | 2/1927 | Rotthouse .......... A47G 25/0685 |
| | | | | 211/105 |
| 1,627,559 | A | * | 5/1927 | Haul ................ A47G 25/0685 |
| | | | | 211/202 |
| 4,131,205 | A | * | 12/1978 | Malecki ................ D06F 57/10 |
| | | | | 211/202 |
| 4,168,006 | A | * | 9/1979 | Yamamoto ............ D06F 57/00 |
| | | | | 211/1.51 |
| 6,394,292 | B1 | * | 5/2002 | Sabounjian ............ D06F 57/10 |
| | | | | 211/202 |
| 6,932,227 | B1 | * | 8/2005 | Glenn .................... D06F 57/08 |
| | | | | 211/202 |
| 8,100,274 | B2 | * | 1/2012 | Trowsdale ............ D06F 57/08 |
| | | | | 211/195 |
| 9,765,470 | B1 | * | 9/2017 | Dufresne ................ F16M 11/38 |
| 2001/0001199 | A1 | * | 5/2001 | Sabounjian ............ D06F 57/08 |
| | | | | 211/202 |
| 2004/0074858 | A1 | * | 4/2004 | Thuma .................... D06F 57/00 |
| | | | | 211/202 |
| 2004/0104190 | A1 | * | 6/2004 | Trowsdale ............ D06F 57/10 |
| | | | | 211/202 |
| 2007/0131633 | A1 | * | 6/2007 | Ferm ........................ A47F 5/10 |
| | | | | 211/126.6 |
| 2007/0138119 | A1 | * | 6/2007 | Schwerdlin ............ D06F 57/10 |
| | | | | 211/202 |

* cited by examiner

FOLDING COOLING RACK

CROSS-REFERENCE TO RELATED APPLICATIONS

The instant application claims priority to Chinese Patent Application 202120566575.5, filed on Mar. 19, 2021, which is incorporated herein by reference.

TECHNICAL FIELD

The invention relates to the field of processing of baking food, in particular to a folding cooling rack for baking food.

BACKGROUND TECHNOLOGY

At present, there are two commonly used folding cooling rack on the market, one's height is not adjustable, its operation is relatively simple and convenient, but it shortfall is: it can only be adjusted to one height, while its storage needs two steps of operation, and its operation is a little inconvenient. The other one can be adjusted to different height, but its shortfall is: when it is opened or folded, the product needs to be put down and then operated step by step or it requires cooperation of two people. The disadvantages of the above two products will not only make users unable to use the products efficiently and conveniently, but also waste a lot of manpower, material resources and time.

In view of the problems in related technology, no effective solutions have been put forward.

Invention

In view of the above technical problems in related technology, the invention provides a folding cooling rack baking food, which can solve the problem that the height of the cooling rack for baking food cannot be adjusted or is inconvenient to be adjusted; which indirectly solves the problem of waste of manpower, material resources and time of users.

A folding cooling rack for baking food includes the main frame and the cooling rack, the main frame as described is equipped with legs and connecting rod component at the left and right ends, the legs as described is equipped with the first fixing rail at the front and rear end, the first fixing rail as described is respectively connected at both ends by the first nut device to the legs as described, the legs as described is also equipped with a chute, the connecting rod component as described is composed of two connecting rods, the two connecting rods as described are flexibly connected at the center by the rivet connecting device, and the connecting rod component as described is connected to the pulley connecting rod below its front end, the pulley connecting rod as described is equipped with plastic pulley at each end, the plastic pulley as described is flexibly connected to the chute, the connecting rod component as described is flexibly connected below its rear end by the second nut device to the legs as described, the connecting rod component as described is equipped with the second nut device as described above its front and rear end, the connecting rod component as described is equipped with the second fixing rail above its front end, the second fixing rail as described is flexibly connected by the second nut device as described to the connecting rod component as described, the cooling rack as described is equipped with stainless steel wire, the stainless steel wire as described is welded and fixed with the stainless steel frame, the stainless steel frame as described is welded and fixed with fixing rotating shaft at the back, the fixing rotating shaft is connected to the rear end of the connecting rod component through the second nut device.

Further, the lower part of the legs are provided with a non-slip sleeve where they are in contact with the ground.

Further, the chute as mentioned is equipped with several height control grooves, the height control groove as mentioned fits the gaps of the plastic pulley as mentioned.

Further, above the connecting rod component as described is equipped with several layers of connecting rod component as described, the connecting rod component as described is connected to the connecting rod component of the upper layer at its lower front end by the upper front end of the second nut device as mentioned, the connecting rod component as described is connected to the connecting rod component of the upper layer at its lower rear end by the upper front and rear end of the second nut device as mentioned, the aforementioned several connecting rod components are connected in sequence.

Further, the connecting rod component as mentioned from each layer is equipped with the cooling rack as mentioned, the first layer of the cooling rack as mentioned is placed horizontally on the pulley connecting rod as mentioned, the several layers of cooling racks as mentioned above are all placed horizontally on the second fixing rail as mentioned.

Benefits of the Invention:

1. The invention adopts a multi-layer connecting rod component and a cooling placing layer, which greatly improves the use efficiency of the rack and also saves manpower, material resources and time.

2. The invention adopts a height control groove and a pulley connecting rod, so that the height of the rack can be flexibly adjusted according to use demand, and it can be simply and easily used by one person.

DESCRIPTION OF FIGURES

In order to illustrate the implement example of this invention or the technical proposal of the existing technology, the figures that are necessary in the implement example will be briefly introduced hereinafter, obviously, the figures described hereinafter are only some implement examples of the invention, for the common technical personnel in this field, on the premise of not giving creative work, additional figures may also be obtained from these figures.

Figure 1:
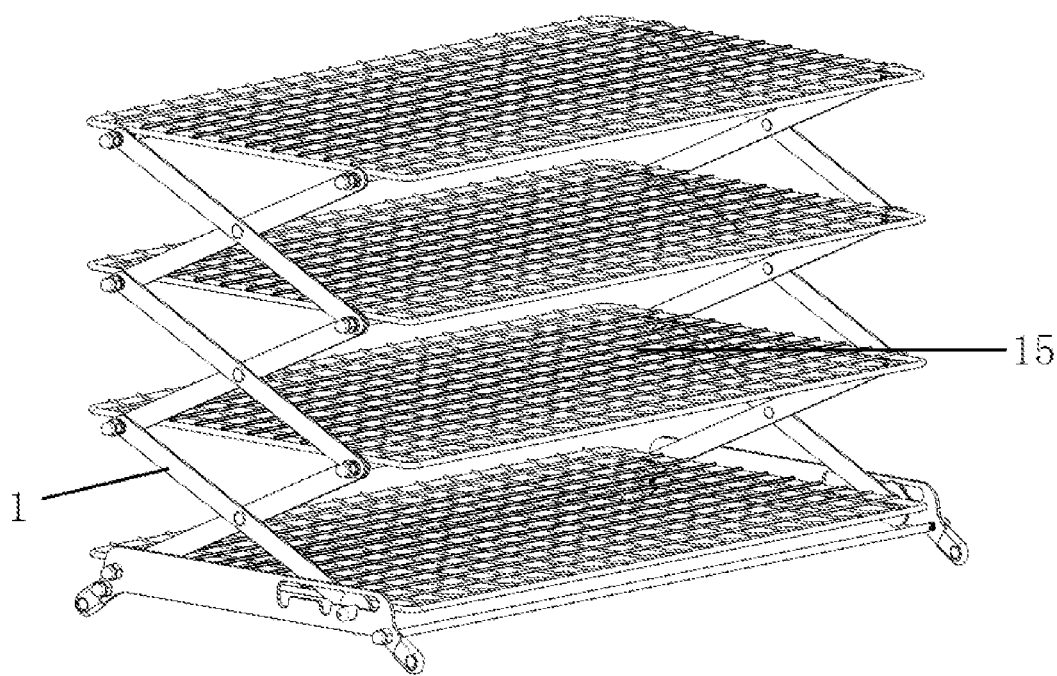
FIG. 1 is the structure diagram of a folding cooling rack for baking food as described based on this invention.

In the figure: 1. main frame, 2. legs, 3. height control groove, 4. plastic pulley, 5. pulley connecting rod, 6. the second fixed rail, 7. the first nut device 8. the second nut device 9. connecting rod 10. rivet device 11. stainless steel wire 12. Fixing rotating shaft, 13. anti-slip sleeve, 14. stainless steel frame, 15. rack, 16. connecting component, 17. the first fixing rail. 18. chute.

Implement

Hereinafter, in combination with the figures in the implement example of this invention, the technical proposal of the implement example of the invention will be describe clearly and completely, obviously, the implement examples are only a part of the implement examples of the invention, rather than all of the implement examples. Based on the implement examples of the invention, all other implement examples that are obtained by common technical personnel in this field, are under the scope of protection of this invention.

Figure 2:
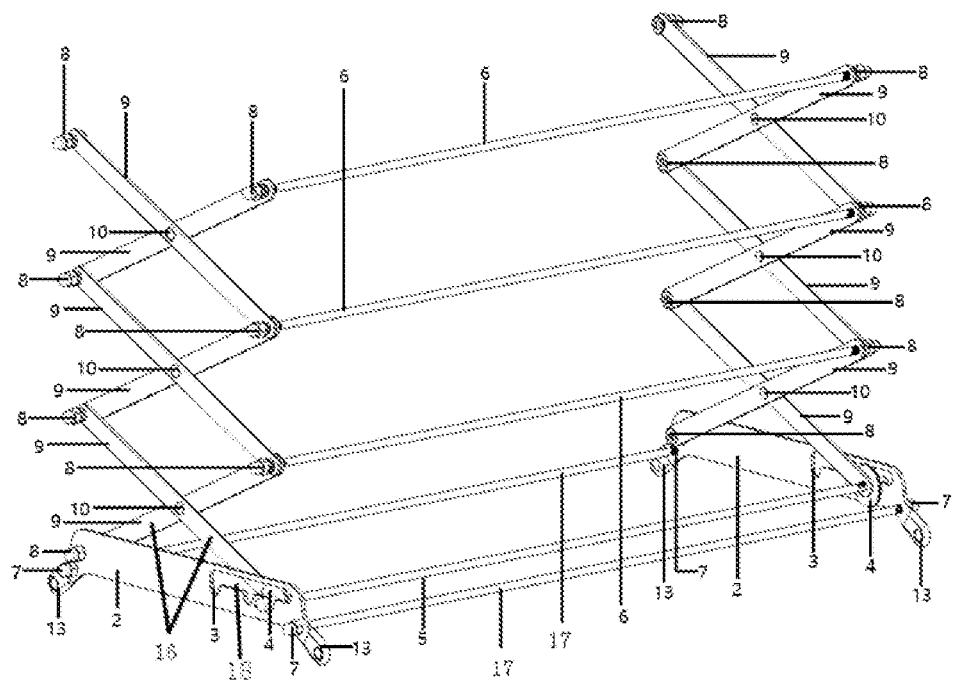
FIG. 2 is the structure diagram of the main frame of a folding cooling rack for baking food as described based on this invention.
Figure 3:
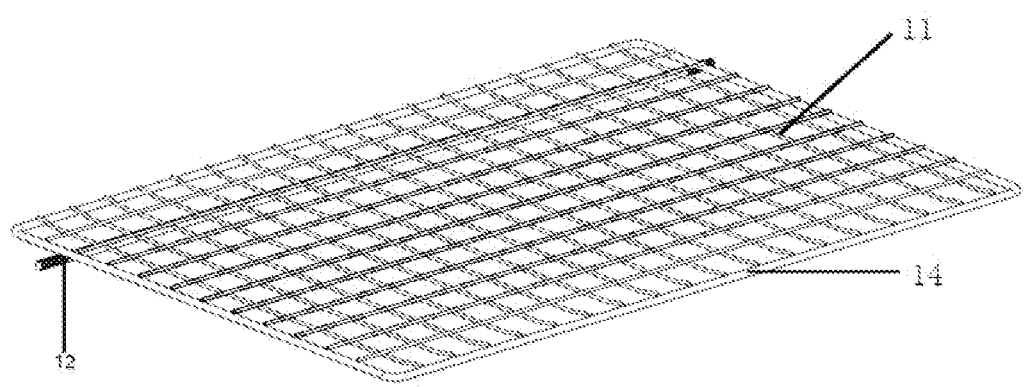
FIG. 3 is the structure diagram of the racks of a folding cooling rack for baking food as described based on this invention.

As shown in FIG. 1-3, the invention provides a folding cooling rack for baking food is characterized by: including the main frame (1) and the cooling rack (15), legs (2) and connecting rod component (16) set at the left and right ends of the main frame as described (1), legs as described (2) and the first fixing rail set at its the front and rear end (17), the first fixing rail as described (17) is respectively connected at both ends by the first nut device (7) to the legs as described (2), the legs as described (2) is also equipped with a chute (18), the connecting rod component as described (16) is composed of two connecting rods (9), the two connecting rods as described (9) is flexibly connected at the center by the rivet connecting device (10), and the connecting rod component as described (16) is connected to pulley connecting rod (5) below its front end, the pulley connecting rod as described (5) is equipped with plastic pulley (4) at each end, the plastic pulley as described (4) is flexibly connected to the chute (18), the connecting rod component as described (16) is flexibly connected below its rear end by the second nut device (8) to the legs as described (2), the connecting rod component as described (16) is equipped with the second nut device as described (8) above its front and rear end, the connecting rod component as described (16) is equipped with the second fixed rail (6) above its front end, the second fixed rail as described (6) is flexibly connected by the second nut device as described (8) to the connecting rod component as described (16), the cooling rack as described (15) is equipped with stainless steel wire (11), the stainless steel wire as described (11) is welded and fixed with the stainless steel frame (14), the stainless steel frame as described (14) is welded and fixed with fixing rotating shaft (12) at the back, the fixing rotating shaft (12) is connected to the rear end of the connecting rod component (16) through the second nut device (8).

In one implement example of the invention, the lower part of the legs (2) where in contact with the ground are provided with an anti-slip sleeve (13), which increases the friction with the ground and prevents the loss caused by sliding of the racks when in use.

In one implement example of the invention, the chute as described (18) is set with several height control groove (3), the height control groove as described (3) fits the gaps of the plastic pulley as described (4), the height control groove (3) of different positions corresponds to the racks of different height, when the plastic pulley (4) is at frontmost height control groove (3) of the chute (18), the rack is at the lowest position; when the plastic pulley (4) is at rearmost height control groove (3) of the chute (18), the rack is at the highest position In one implement example of the invention, above the connecting rod component as described (16) is equipped with several layers of connecting rod component as described (16), the connecting rod component as described (16) is connected to the connecting rod component of the upper layer at its lower front end by the upper front end of the second nut device as mentioned (8), the connecting rod component as described (16) is connected to the connecting rod component of the upper layer at its lower rear end by the upper front and rear end of the second nut device as mentioned (8), the aforementioned several connecting rod component (16) is connected in sequence, this allows the connecting rod component to act in the same way when moving.

In one implement example of the invention, the connecting rod component as mentioned (16) from each layer is equipped with the cooling rack as mentioned (15), the first layer of the cooling rack as mentioned (15) is placed horizontally on the pulley connecting rod as mentioned (5), the several layers of cooling racks as mentioned above (15) are all placed horizontally on the second fixing rail as mentioned (6).

In order to facilitate the understanding of the above technical proposal of the invention, the above technical proposal of the invention will be described in detail with the specific use method as follows:

When used, according to a folding cooling rack for baking food as described in the invention, when adjusting the height of the rack, the user only needs to lift the pulley connecting rod (5), and then push or pull the plastic pulley (4) at the left and right ends of the pulley connecting rod (5) to slide into the corresponding chute, so as to adjust to different height; so, when it is necessary to adjust the rack to a higher position, all one needs to do is to slide one end of the plastic pulley (4) to height control groove (3) at the back of the chute (18); when it is necessary to lower the rack, all one has to do is to slide one end of the plastic pulley (4) to height control groove (3) in the front of the chute (18); The invention adopts multiple connecting rod component and cooling rack, the efficiency of the use of cooling rack is greatly improved, while manpower, material and time are saved; by using height control groove and pulley connecting rod, the height can be flexibly adjusted according to the use of the rack, and the operation is simple, it can easily be operated and used by one person.

The above-mentioned are only the better implement examples of the invention and shall not be used to restrict the invention. Any modification, equivalent replacement, improvement, etc. made within the spirit and principles of the invention shall be included in the scope of protection of the invention.

What is claimed is:

1. A folding cooling rack for baking food comprising: a main frame, at least one cooling rack, and legs; wherein the main frame comprises connecting rod components and a corresponding leg form said legs left and right ends of the main frame, a first fixing rail set at a front end and a rear end of the main frame; each first fixing rail is respectively connected at opposite a chute therein, each connecting rod component is composed of two connecting rods, the two connecting rods are flexibly connected at a center thereof by a rivet connecting device, and a pulley connecting rod span between and is connected to the chutes of the legs; each connecting rod component is connected to pulley connecting rod below the rivet connecting device at the center of the two connecting rods, the pulley connecting rod has a plastic pulley at each end of the pulley connecting rod, the plastic pulley is flexibly connected to the chutes, the connecting rod components are flexibly connected to the legs below the rivet connecting device at the center of the two connecting rods by second nut devices, a second fixed rail spans between and is connected to the connecting rod components above the first fixed rail and the rivet connecting device at the center of the two connecting rods, the second fixed rail is flexibly connected to the connecting rod components by third nut devices, the at least one cooling rack comprises stainless steel wire and a stainless steel frame, the stainless steel wire is welded and fixed to the stainless steel frame, the stainless steel frame is welded and fixed to a fixing rotating shaft at a back portion of the stainless steel frame, the fixing rotating shaft is connected to the rear end of the connecting rod components through fourth nut devices.

2. The folding cooling rack for baking food according to claim 1, wherein a lower part of the legs are provided with a non-slip sleeve in that is configured to contact a ground surface.

3. The folding cooling rack for baking food, wherein each comprise a height control groove.

4. The folding cooling rack for baking food according to claim 1, wherein the connecting rod components comprises is a plurality of layers of connecting rod components that are vertically stacked on top of each other at the left and right ends of the main frame.

5. The folding cooling rack for baking food according to claim 4, wherein the at least one cooling rack comprises a plurality of cooling racks, wherein each of the plurality of cooling rack are connected to a corresponding layer of the connecting rod components at different heights wherein a corresponding first layer of the plurality of cooling racks is placed horizontally on the pulley connecting rod, and other corresponding layers of the plurality of cooling racks are all placed horizontally on corresponding fixing rails.

\* \* \* \* \*